INVENTOR.
RICHARD D. HOUK
BY Hamilton, Cook,
Renner & Kenner
ATTORNEYS

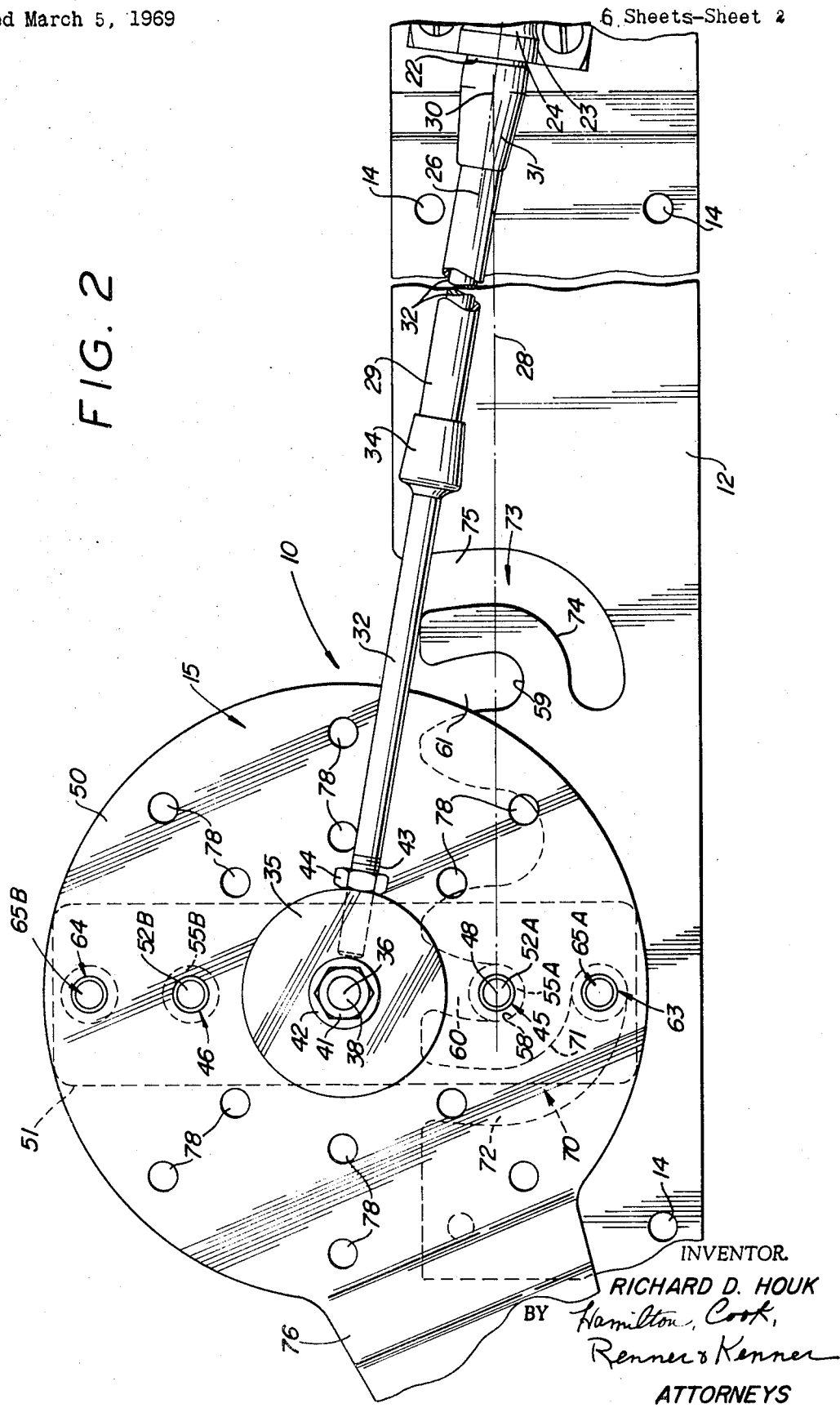

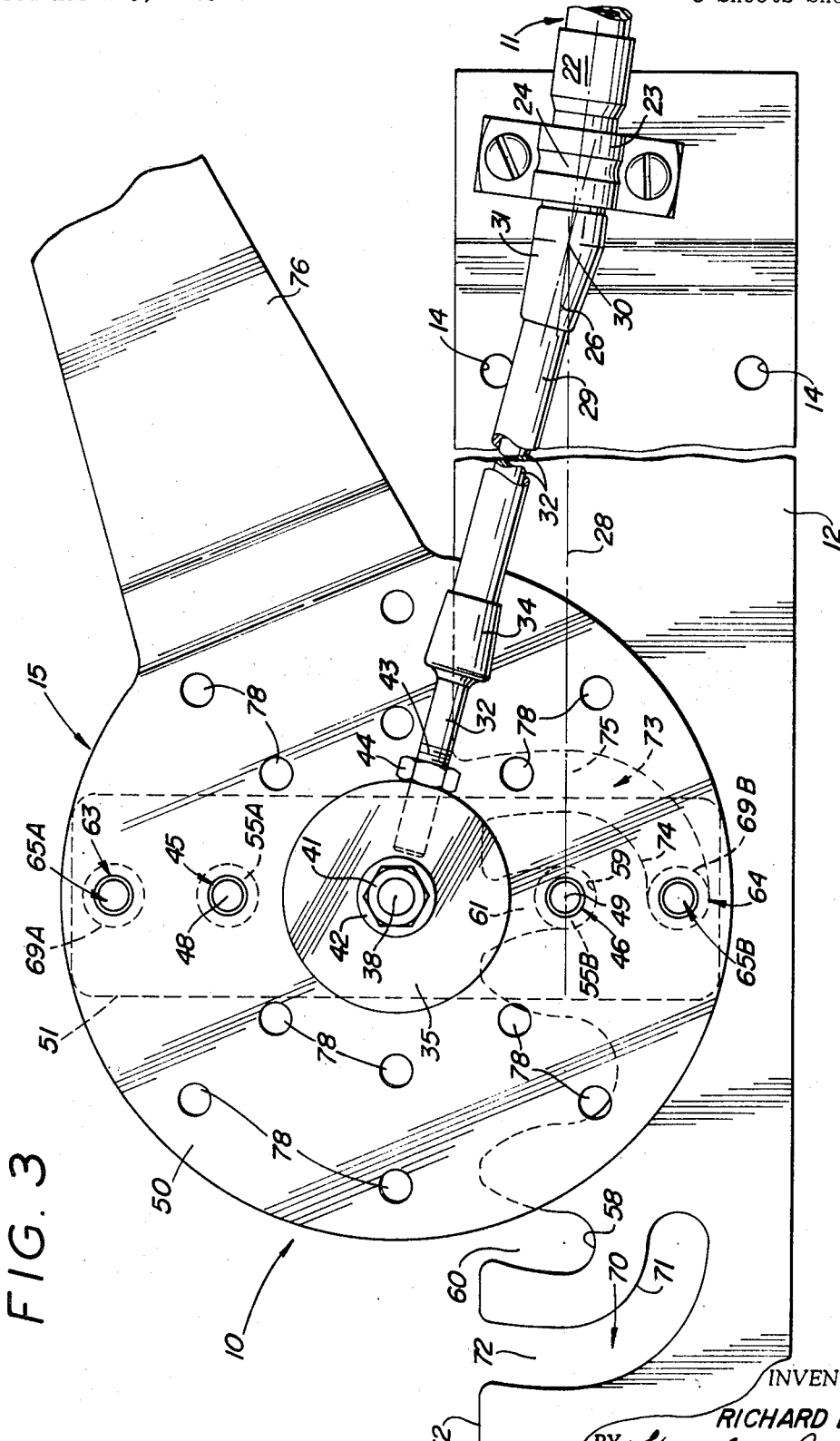

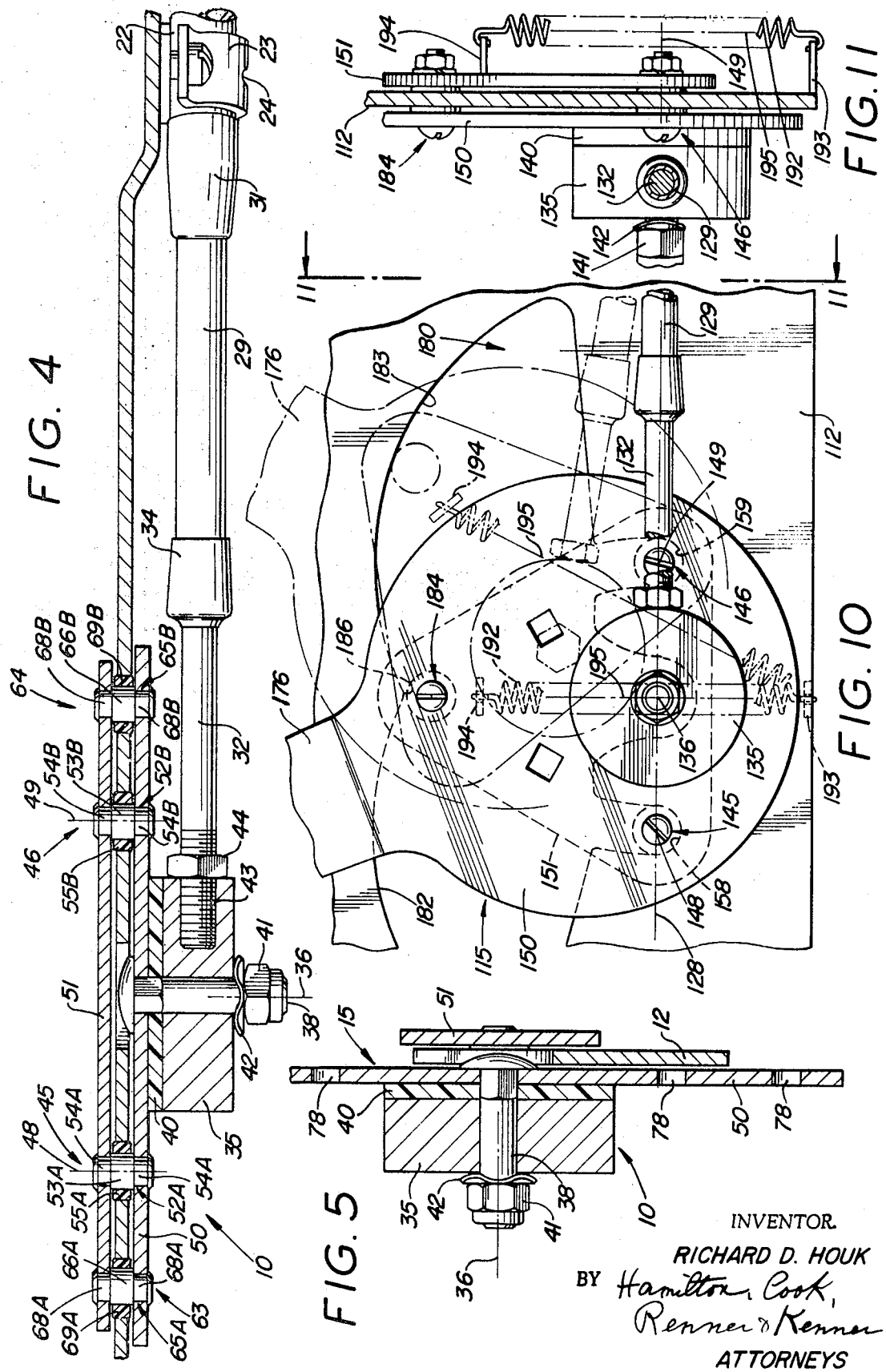

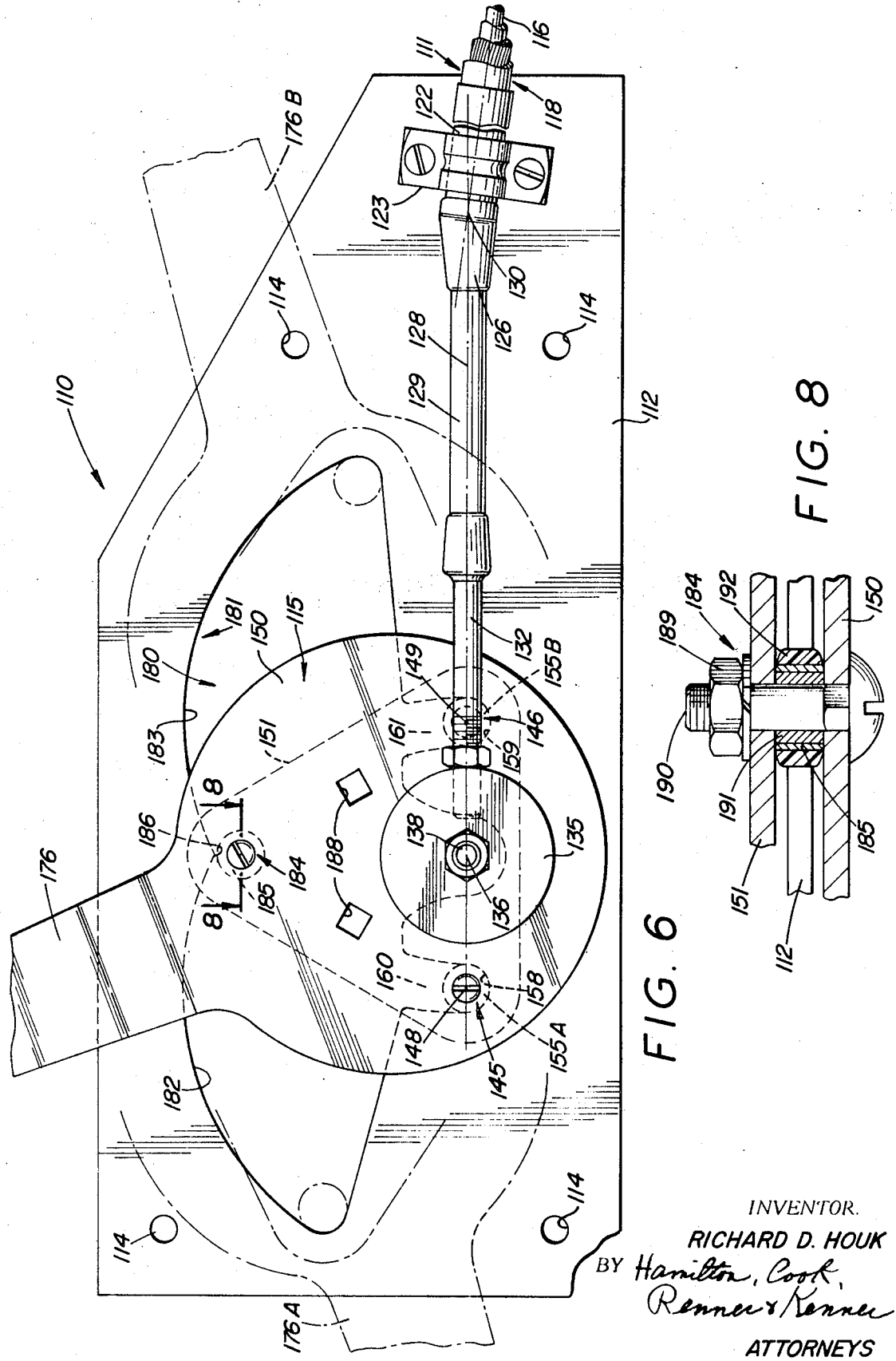

March 2, 1971   R. D. HOUK   3,566,712
NONLINEAR CONTROL
Filed March 5, 1969   6 Sheets-Sheet 6
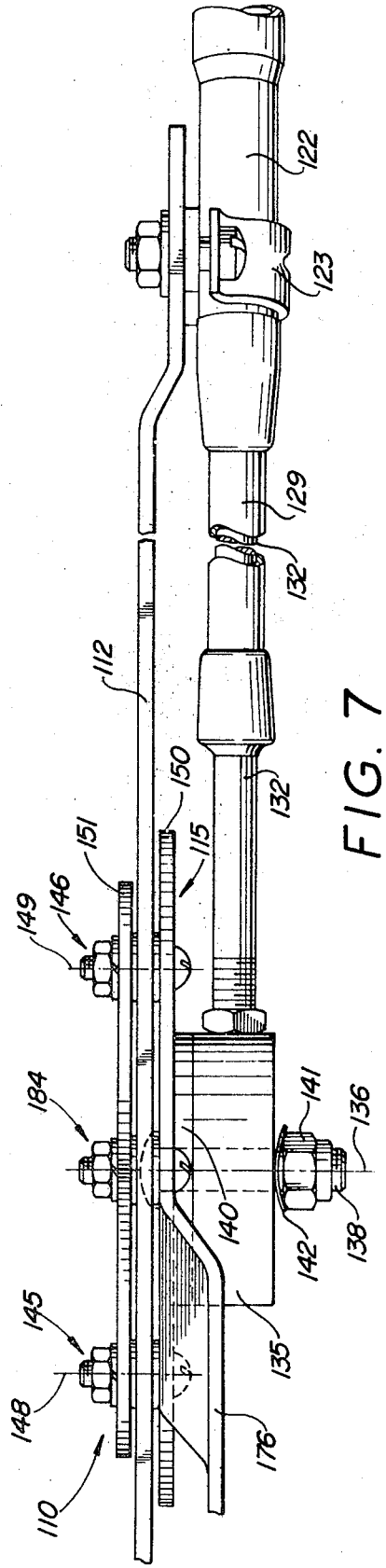
INVENTOR.
RICHARD D. HOUK
BY Hamilton, Cook,
Renner & Kenner
ATTORNEYS

United States Patent Office

3,566,712
Patented Mar. 2, 1971

3,566,712
NONLINEAR CONTROL
Richard D. Houk, Stow, Ohio, assignor to North
American Rockwell Corporation, Pittsburgh, Pa.
Filed Mar. 5, 1969, Ser. No. 804,468
Int. Cl. G05g 1/00
U.S. Cl. 74—491                                                19 Claims

ABSTRACT OF THE DISCLOSURE

A control for inducing movement to a motion transmitting device as a nonlinear function of the movement applied to the control lever. The working element of a mechanical motion transmitting device is secured to a connector that is rotatably carried on a throw member. The throw member is, in turn, mounted on a frame for swinging movement about selective pivot axes located eccentrically of the axis about which the connector is rotatably carried on the throw member. These axes are parallel and lie within the same reference plane when the control lever, secured to the throw member, is in its neutral position. From this neutral position the control lever is movable through first and second operating ranges, and interlock means restrict the throw member to movement about the axis of one pivot means when the cotnrol lever is within the first operating range, and, similarly, to movement about the axis of the other pivot means when the control lever is within the second operating range. Movement of the throw member about these selective axes, displaced from the axis about which the working element of the motion transmitting device is connected to the throw member, effects transmission of motion by the motion transmitting device that is a nonlinear function of the movement applied to the control lever.

BACKGROUND OF THE INVENTION

The present invention relates to a control that induces movement to a motion transmitting device as a nonlinear function of the movement applied to the control lever and is, thereby, particularly suitable for actuating a hydrostatic transmission. Specifically, the present invention relates to a control by which movement of a swash plate, operatively connected to the control by a motion transmitting device, is is effected as a nonlinear function of the movement applied to a control lever so that the range of movement by the control lever, for a given incremental movement of the swash plate, increases proportionately to the proximity of the control lever to its neutral position.

Hydrostatic transmissions for vehicles are not new. They have been utilized as specialty devices for a number of years, but until recently have not been considered practical for commercial use because of cost, size, efficiency and controllability. Recent advances in production techniques have made reliable high pressure hydrostatic components available at a cost competitive with more common means of power transmission. Such hydrostatic transmission units offer numerous distinct advantages, most noteworthy being the absence of gear shift levers and the smooth, stepless availability of infinitely variable power transmission ratios.

Briefly, hydrostatic transmissions employ a hydraulic pump to operate a hydraulic motor. Both the pump and motor usually utilize multiple pistons oriented axially in spaced relation about the circumference of a circle centered on the rational axis of the respective pump and motor rotors. A power source rotates the pump rotor and effects reciprocation of the pistons therein against a pump swash plate to force the hydraulic fluid from the pump into the motor. The admission of hydraulic fluid, under pressure, from the pump into the motor reciprocates the pistons in the latter against a motor swash plate to effect rotation of a motor rotor that is operatively connected to the device to be driven. The displacement per stroke of the pistons in either, or both, the pump and motor may be selectively varied by controlling the inclination of the swash plates with respect to the rotational axes of the respective pump and motor rotors.

If the swash plates on both the pump and motor are selectively variable, the hydrostatic transmission is referred to as a variable pump-variable motor variety; if only the swash plate on the pump is selectively variable, the hydrostatic transmission is referred to as a variable pump-fixed motor variety. Controls for varying the inclination of one or more swash plates—i.e., stroking the transmission—are generally located remotely therefrom and are connected thereto by motion transmitting devices.

Hydrostatic transmissions in which the inclination of only one swash plate can be varied have been found to be particularly suitable for vehicles having a high horse power/weight ratio—such as light garden tractors—except that controls heretofore developed are not capable of effecting the smooth variation in the power transmission ratios capable with hydrostatic transmissions, particularly in proximity to neutral.

Whereas transmissions other than hydrostatic transmissions utilize a gradual increase in the power output from the prime mover, or engine, smoothly to increase the speed of the vehicle from a stationary position, when driving through a hydrostatic transmission the engine generally operates at a fixed power output—normally that associated with the most efficient r.p.m. of the engine—and the hydrostatic transmission must be controlled to effect the desired gradual feed of power from the engine, preset to operate at a selected r.p.m., into the driven component.

As a result of receiving power into the transmission at a fixed output from the engine, in the exemplary environment of a vehicle having a high horse power to weight ratio the closer the control lever is to the neutral position the more care must be exercised in the application of power to the drive wheels. Otherwise, the vehicle will tend to lurch, and this lurching will merely compound the difficulty encountered by the operator as he attempts to effect a smooth variation in the application of power to the vehicle.

Prior known controls have also required detent means, or the like, both to locate the neutral position and to retain the control lever therein. Such neutral locating devices always require the application of some pressure in addition to that required to stroke the swash plate merely to release the control lever from the detent. When the pressure required to overcome the neutral locating device must be applied to the control lever, as it generally is, the application of the delicate movement heretofore required to effect a gradual application of power through the hydrostatic transmission is even further hindered.

It has also been found that the variable swash plate in many hydrostatic transmissions has a tendency to seek neutral once it is within a narrow range thereof, generally only about one degree. Most prior art controls, however, are not capable of capitalizing on this inherent tendency of the swash plate in hydrostatic transmissions.

SUMMARY OF THE INVENTION

It is, therefore, a primary object of the present invention to provide a control device by which movement imparted to the motion transmitting device operatively attached thereto is a predetermined, nonlinear function of the movement of the control lever.

It is another object of the present invention to provide a control device, as above, in which the range of movement of the control lever required to effect a given increment of movement in the motion transmitting device operatively attached thereto increases in proportion to the proximity of the control lever to its neutral position.

It is a further object of the present invention to provide a control device, as above, in which a tactile determination is afforded to signal the arrival of the control lever at its neutral position without requiring the application of additional force to overcome the neutral position indication as the control lever moves from its neutral position into its operating ranges, and, as a further result of this unique concept, to provide a control which will lock in the neutral position against back pressure applied thereto by the motion transmitting device.

It is a still further object of the present invention to provide a control device, as above, which does not inhibit, but rather capitalizes upon, the narrow neutral seeking range of the swash plate in a typical hydrostatic transmission.

It is an even further object of the present invention to provide a control device, as above, in which spring means may be incorporated to effect either a neutral "dead man" return or a means biasingly to retain the control fully actuated.

These and other objects which will become apparent from the following specification are accomplished by means hereinafter described and claimed.

In general, a control device embodying the concept of the present invention has at least one pivot means by which a throw member is mounted for swinging movement on a frame. A control lever attached to the throw member permits the throw member to be selectively rotated about the axis of the pivot means.

A connector is rotatably mounted on the throw arm about an axis eccentrically located with respect to the axis of the pivot means, and the working element of the motion transmitting device is operatively secured to the connector such that the line of action thereof within the control device lies transversely the rotational axes of both the pivot means and the connector and substantially intersects said axes when the control lever is in its neutral position.

Generally, two pivot means will be employed and the rotational axis of the second pivot means will also be located eccentrically with respect to the axis of the connector, but on the opposite side thereof with respect to the first pivot means. When two such pivot means are employed the axes thereof will lie, when the control lever is in its neutral position, in the same plane as the axis about which the connector is rotatably mounted on the throw member. This plane is the neutral reference plane, and, within the control device, the line of action of the motion transmitting device will also lie in said plane when the control lever is in neutral, the line of action thereby transversely intersecting the two pivotal axes and the axis of the connector, all three axes being parallel.

When two such pivot means are employed the frame is provided with a travel slot for each pivot means and interlock means that permit the throw member to swing only about one pivot means at a time.

Two alternatively preferred embodiments, and two variations thereon, are shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 2 is a view similar to FIG. 1 but depicting the control lever, and associated mechanism, fully moved from the neutral position through a first operating range;

FIG. 3 is a view similar to FIGS. 1 and 2 but depicting the control lever, and associated mechanism, fully moved from the neutral position through a second operating range;

FIG. 4 is a horizontal cross section taken substantially on line 4—4 of FIG. 1;

FIG. 5 is a vertical cross section taken substantially on line 5—5 of FIG. 1;

FIG. 6 is a side elevation, similar to FIG. 1, depicting an alternative form of a control device embodying the concept of the present invention with the solid line representation of the control lever defining the neutral position and the chain line representations thereof depicting the control lever moved fully through first and second operating ranges;

FIG. 7 is a partial top plan of the control depicted in FIG. 6;

FIG. 8 is an enlarged cross section taken substantially on line 8—8 of FIG. 6;

FIG. 9 is a graphic representation of the movement effected in the working element of a motion transmitting device by a control embodying the concept of the present invention in response to movement of the control lever;

FIG. 10 is a side elevation similar to a portion of FIG. 6 depicting a variation readily adaptable to either of the alternative forms of the control shown in the drawings—the solid line representation depicting the control in neutral and the phantom representation depicting the control actuated partially through the second operating range; and FIG. 11 is a cross section taken substantially on line 11—11 of FIG. 10.

DESCRIPTION OF THE PREFERRED EMBODIMENTS

Figure 1:
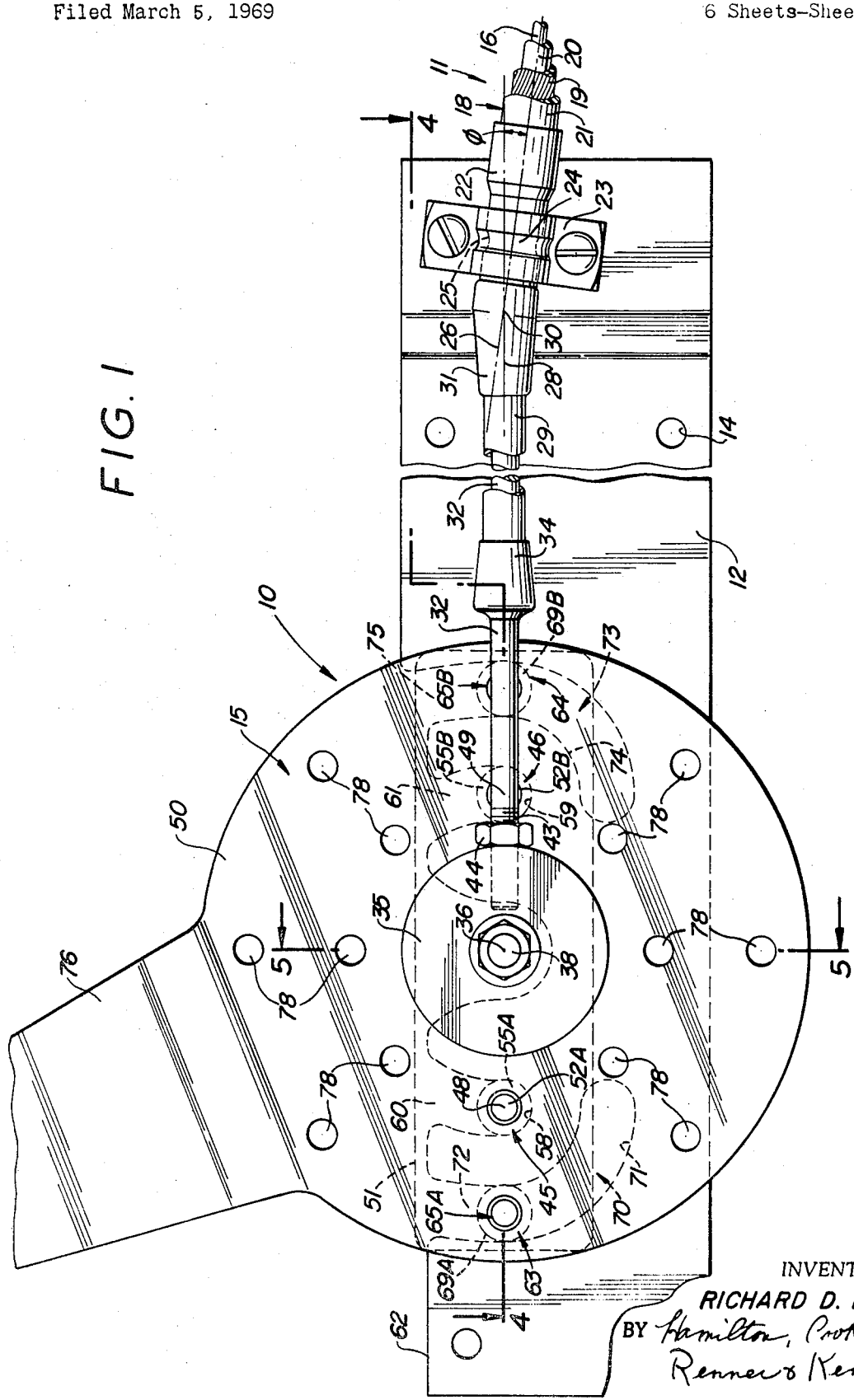
FIG. 1 is a side elevation of one embodiment of a control device embodying the concept of the present invention operatively attached to a motion transmitting device of the push-pull cable variety and depicting the control lever, and associated mechanism, in the neutral position.

Referring more particularly to the drawings, one embodiment of a control incorporating the concept of the present invention is designated generally by the numeral 10 and is depicted operatively connected to a motion transmitting device in the nature of a push-pull control cable 11. The control 10 has a frame 12 adapted to be secured to a console (not shown) by a plurality of bolts or the like (also not shown) received through mounting holes 14. A throw member 15 is mounted for swinging movement on the frame 12, as will be hereinafter more fully described.

The push-pull cable 11 may be of any conventional construction in which a core, or working element, 16 slidably reciprocates within a casing, indicated generally by the numeral 18, to transmit mechanical motion by the application of either tensile or compressive forces to the core 16 when at least the ends of the casing 18 are clamped in a position fixed with respect to the core 16. In the exemplary construction depicted (FIG. 1), the casing 18 is formed of a plurality of casing wires 19 laid contiguously, in the form of a long pitched helical coil, about the radially outer surface of an inner, flexible, plastic tube 20 that extends the full length of the casing 18. An outer cover 21 encases the coil of wires 19 up and to within a short distance from the ends thereof.

A fitting 22 is positioned over the end of the cable casing 18 and is cold swaged, or otherwise suitably connected, onto the exposed portion of the cylindrical grouping of wires 18. A plurality of ribs, not shown, may be provided within the end fitting 22, which, when crimped onto the outer cover 21, effects a seal between the end fitting 22 and cover 21. The end fitting 22 is secured to the frame 12 by a clamp 23. In the exemplary construction depicted the clamp 23 is provided with a dimple 24 that interfits with an annular recess 25 in the end fitting 22 to assure a fixed location for the end of the cable casing 18 with respect to its own axis 26.

As best seen in FIG. 1, frame 12 is mounted to accommodate the run of control cable 11. That is, the frame 12 is mounted on the console (not shown) such that with the cable 11 secured to frame 12 by clamp 23, the casing axis 26 is preferably inclined—while the control is in the neutral position depicted in FIG. 1—beneath a neutral reference axis 28, as hereinafter more fully defined, at an angle Phi ($\phi$).

An extension tube 29 is mounted on the end fitting 22 for gyration about a swing center 30 which is also preferably positioned within the neutral reference plane 28, as will be hereinafter more fully discussed. The gyrational mounting, which is generally a modified ball and socket arrangement (not shown), is preferably protected by a resilient sealing sleeve 31.

An end rod 32, which is secured to the cable core 16 in a well-known fashion so as to become in effect, an extension thereof, is closely received within the extension tube 29. The tube 29 not only guides the rod 32 as it slides therein but also prevents excessive deflection of that portion of the core 16 which slides therein, particularly when subjected to compressive loads. A resilient sealing sleeve 34 may also be provided at the juncture of rod 32 and tube 29.

A connector 35 is mounted on the throw member 15 to rotate about an axis 36 that also lies within the neutral reference plane 28 under conditions also hereinafter more fully described. As shown in FIG. 4, a carriage bolt 38 extends perpendicularly outwardly from the throw member 15 and provides an axle on which the connector 35 is rotatably mounted. A friction disc 40 is interposed between the connector 35 and the throw member 15, and a nut 41 threaded onto the bolt 38 may be tightened against a spring washer 42 to control the pressure applied against the friction discs 40 and thereby adjust the frictional resistance offered against movement of the throw member 15.

The connector 35 may be bored and tapped to receive the threaded portion 43 of the end rod 32 therein. A lock nut 44 secures the attachment of the end rod 32 to the connector 35.

The throw member 15 is selectively swingable about first and second pivot means 45 and 46, respectively. The axes 48 and 49 of the respective pivot means 45 and 46 are located eccentrically with respect to the axis 36 about which the connector 35 is rotatably mounted on the throw member 15. In the embodiment depicted in FIGS. 1–5, the throw member 15 comprises a drive plate 50 and a backing plate 51 spaced to embrace the frame 12. The pivot means 45 and 46 may comprise shouldered rivets 52A and 52B, respectively, which join the plates 50 and 51 and maintain them properly spaced. The medial portions 53A and 53B of rivets 52A and 52B span between the plates 50 and 51 and are of greater diameter than the end portions 54A and 54B that pierce the space plates 50 and 51. The medial portions 53A and 53B comprise journal means on which sleeve bearings 55A and 55B turn.

The sleeve bearings 55A and 55B are respectively received in bearing seats 58 and 59 provided in frame 12. The bearing seat 58 has a travel slot 60 that extends therefrom in a path arcuate about the opposite bearing seat 59, and a travel slot 61 likewise extends from bearing seat 59 in a path arcuate about the opposite bearing seat 58. As shown, the travel slots 60 and 61 converge upwardly and may even open through the edge 62 of frame 12.

A pair of interlock means 63 and 64 are also secured to the throw member 15 and may likewise comprise shouldered rivets 65A and 65B which assist not only in joining the plates 50 and 51 but also in keeping them properly spaced. The medial portions 66A and 66B of rivets 65A and 65B also span between plates 50 and 51 and are of greater diameter than the end portions 68A and 68B that pierce the plates 50 and 51. The medial portions 66A and 66B comprise journal means on which followers 69A and 69B are rotatably mounted. The follower 69A is movable within an aperture 70 which has a camming portion 71 that is arcuate about bearing seat 58 and a mouth portion 72 that is arcuate about seat 59. The following 69B is likewise movable within an aperture 73 which has a camming portion 74 that is arcuate about bearing seat 59 and a mouth portion 75 that is arcuate about bearing seat 58. The junctures of the camming and mouth portions of both apertures 70 and 73 occur along the neutral reference plane 28.

A control lever 76 is provided for swinging the throw member 15 about the axis of selected pivot means 45 or 46. As shown, the control lever 76 may comprise an extension of drive plate 50.

Reverting particularly to FIG. 1, the neutral position obtains when the sleeve bearings 55A and 55B both rest against their respective seats 58 and 59. As shown, the control lever 76 may extend upwardly and to the left. It must be appreciated, however, that with the construction depicted one may adjust the neutral orientation of the control lever independently of the position in which the frame 12 is mounted. As was previously mentioned and as is hereinafter more fully explained in conjunction with the operation of the subject control, the frame 12 is preferably mounted to accommodate the run in the push-pull cable 11 as it approaches the frame. As such, it may well be that the disposition of the control lever desired by the operator may not be presented by a disposition of the control lever 76 relative to the frame 12, as depicted. Some accommodation for selecting control lever orientation may be provided by presenting a plurality of bores 78 located about the circumference of two concentric circles and aligned along a plurality of angularly spaced diameters. The rivets 52A and 52B and the rivets 65A and 65B may be secured through the bores 78 on any selected diameter to adjust the orientation on the control lever 76. Should one require, or desire, an orientation for the control lever that cannot be achieved by the bores 78 provided, a custom orientation may be achieved by penetrating the plates 50 and 51 with at least four additional bores compatible to the orientation desired.

From the neutral position of FIG. 1 the control lever 76 can, when two spaced pivot means 45 and 46 are employed, be moved through oppositely directed first and second operating ranges.

When the control lever is moved to the left, as viewed in FIG. 1, into the first operating range the throw member 15 will rotate about axis 48 with the sleeve bearing 55A retained against seat 58. At the same time: the pivot means 46 will swing along the travel slot 61; the follower 63 will traverse the camming portion 71 of aperture 70; and, the follower 64 will move through the mouth portion 75 of aperture 73. Because the travel slot 61, the camming portion 71 and the mouth portion 75 are all arcuate about axis 48, the throw member 15 will freely swing about that axis. Movement of the throw member 15 about axis 48—from the FIG. 1 to the FIG. 2 positions—carries the connector 35 therewith and thereby tends to extract the end rod 32 from the extension tube 29 to apply a tensile load to core 16. Reverse movement about axis 48 inserts the end rod 32 within extension tube 29 and thereby applies a compression load to core 16.

A given incremental degree of movement applied to control lever 76 will swing the connector 35 through an identical incremental degree. However, the angular displacement of the connector 35 about axis 48 is comprised of two coordinate components—one generally parallel to the neutral reference plane 28 and one transversely thereof.

With the line of action of the push-pull cable, within the control 10, being identified by the end rod 32, and with the end rod being coincident with the neutral reference plane 28 when the control lever 76 is in the neutral position, the coordinate component transversely of plane 28 will comprise the majority of the movement initially with only a nominal coordinate component parallel to plane 28. As the degree to which the control lever 76 is swung increases, the incremental movement of that coordinate component parallel to plane 28 will increase while the incremental movement of the coordinate component transversely of plane 28 will decrease. This, then will provide the desired nonlineal movement to the end rod 32, and thereby the core 16, in response to movement of the control lever 76. That is, as the control lever 76 is moved in proximity to the neutral position defined by FIG. 1 only a very slight axial displacement of the end rod 32, and thus core 16, occurs for a given degree of movement by the control lever 76. However, as the control lever 76 is moved further and further from its neutral position, the axial displacement of the end rod 32 increases with respect to an identical degree of movement by the control lever 76.

It must also be appreciated that the position of the swing center 30 and the relative orientation of the casing axis 26 with respect to the neutral reference plane 28 contribute to the assurance that the desired nonlinear displacement of the core is not destroyed, and the preferred arrangement thereof will now be described.

As the end rod 32 and extension tube 29 swing about center 30, movement of the connector 35 in other than an arc about center 30 will itself tend to induce an axial displacement of the rod. Because the connector 35 will not swing about center 30 but rather will swing about an axis 48 or 49, the induced displacement of rod 32 can be minimized by several structural considerations.

First, the swing center 30 should be placed within the neutral reference plane 28. Second, the radius from swing center 30 to the connector 35 should exceed the radius from the connector 35 to the pivot axis 48 or 49. Preferably, these radii should differ by a ratio of approximately 4:1, or more. Third, the angle through which the end rod 32 swings should be bisected by the axis 28 of the cable casing as it is secured to the frame 12—thus, when accommodating the frame 12 to the run of cable 11 the axis 26 thereof will lie at an angle $\phi$ beneath the neutral reference plane 28. These three conditions define a typical physical configuration. They may be changed to accommodate a given environment, and, further, by altering these structural dimensions the ratio of the nonlinear function may be varied.

Heretofore, movement of the control lever through the first operating range has been described. The control lever of the embodiment depicted may also be moved through a second operating range. This is accomplished by moving the lever 76 to the right, as viewed in FIG. 1, toward the FIG. 3 position.

Movement of the control lever 76 within the second operating range will cause the throw member 15 to rotate about axis 49 with the sleeve bearing 55B retained against seat 59. At the same time: the pivot means 45 will swing along the travel slot 60; the follower 64 will traverse the camming portion 74 of aperture 73; and, the follower 63 will move through the mouth portion 72 of aperture 70. Here too, because the travel slot 60, the camming portion 74 and the mouth portion 72 are all arcuate about axis 49, the throw member 15 will freely swing about the axis. Movement of the throw member 15 about axis 49—from the FIG. 1 to the FIG. 3 positions—carries the connector 35 therewith and thereby inserts the end rod 32 within extension tube 29 to apply a compression load to core 16. Reverse movement about axis 49 tends to extract the end rod 32 from extension tube 29 and thereby applies a tensile load to core 16.

As the operator moves control lever 76 toward the neutral position from either the first operating range (FIG. 2) or a second operating range (FIG. 3) he is provided with a tactile determination of the exact neutral position. This results when that pivot means moving through its corresponding travel slot bottoms against the seat therein. Tactile determination of neutral is further afforded by the shift, or transfer, of the center about which the control lever 76 will swing as the operator moves beyond neutral. This shifting of the pivot axis does not require additional force to overcome but nevertheless provides a definite locating means for the neutral position of control lever 76.

It must also be pointed out that by having the line of action of the extension rod 32 located within the neutral reference plane 28, and thereby transversely intersecting the axis 36 of connector 35 as well as the axes 48 and 49 of pivot means 45 and 46, respectively, the control lever 76 is locked against feedback from the control cable 11.

It has been found that when the swash plate of a hydrostatic transmission is within one degree of its neutral position it tends to seek neutral in an oscillatory manner. Outside this narrow one degree range the swash plate will tend to full stroke. Thus, with the subject control, the nonlinear movement of the core 16 in response to control lever travel provides a greater range of movement to the control lever as the swash plate approaches its neutral position so that positioning the swash plate within its neutral-seeking range is more readily accomplished. Moreover, when the control lever 76 is in the neutral position the aforementioned relationship of the line of action of end rod 32 to the neutral reference plane 28 precludes dislodgement of the control lever from its neutral position by back pressure in the core 16 that would occur should the swash plate tend to self-stroke.

The same advantages also exist in an alternative form of the control embodying the concept of the present invention that is designated generally by the numeral 110 in FIGS. 6–8 of the drawings. Control 110 is depicted operatively connected to a push-pull control cable 111, and the control 110 also has a frame 112 adapted to be secured to a console (not shown) by a plurality of bolts (also not shown) engaged through mounting holes 114.

A throw member 115 is mounted for swinging movement on the frame 112 through first and second operating ranges. Full movement of the control lever 176 through the first operating range is designated by the chain line position of lever 176A, and full movement of the control lever 176 through the second operating range is designated by the chain line position 176B.

The casing 118 of cable 111 is secured to the frame 112 by a clamp 123, and the core 116 is operatively secured to the connector 135 by way of an end rod 132—serving as an extension thereof—slidably reciprocable within an extension tube 129 mounted on the end fitting 122 for gyration about a swing center 130.

The connector 135 is mounted on the throw member 115 to rotate about an axis 136 that lies within the neutral reference plane 128. As best shown in FIG. 7, a bolt 138 extends perpendicularly outwardly from the throw member 115 and provides an axle on which the connector 135 is rotatably mounted. A friction disc 140 is interposed between the connector 135 and the throw member 115, and a nut 141 threaded onto the bolt 138 may be tightened against a spring washer 142 to control the pressure applied against the friction disc 140 and thereby adjust the frictional resistance, or braking drag, offered against movement of the throw member 115.

The throw member 115 is selectively swingable about first and second pivot means 145 and 146, respectively, and the axes 148 and 149 of the respective pivot means are located eccentrically with respect to the axis 136 about which the connector 135 is rotatable with respect to the throw member 115. In fact, the axes 136, 148 and 149 are parallel and preferably lie within the neutral reference plane 128, when the control is in neutral.

The pivot means 145 and 146 may be utilized to secure the drive plate 150 and backing plate 151 in the spaced relation required to embrace the frame 112. The pivot means 145 and 146 also present sleeve bearings 155A and 155B that are respectively receivable in bearing seats 158 and 159 provided in frame 112. Bearing seat 158 has a travel slot 160 that extends therefrom in a path arcuate about the opposite bearing seat 159. Bearing seat 159 has a similar travel slot 161 that extends therefrom in a path arcuate about the opposite bearing seat 158. As shown, the slots 160 and 161 converge upwardly and open into a voided area 180.

In opposition to the travel slots 160 and 161 the voided area 180 is bounded by a gull-wing camming surface 181 having bilaterally symmetrical lobes 182 and 183. The lobes 182 and 183 are cooperatively interengaged by an interlock means 184 having a follower 185 rotatably supported between the plates 150 and 151 of throw member 115.

With the control lever 176 in the neutral position depicted by the solid line representation of FIG. 6, the pivot means 145 and 146 are both resting against their respective bearing seats 158 and 159 and the follower 185 is positioned against the apex 186 of camming surface 181. As the control lever 176 is moved through the first operating range toward the chain line position 176A, the throw member 115 will rotate about axis 148, the pivot means 145 being retained against seat 158. This is assured by the follower 185 as it traverses lobe 182, arcuate about seat 158. At the same time, the pivot means 146 will swing along the travel slot 161 and into the voided area 180.

By positioning the follower 185 of interlock means 184 and the two pivot means 145 and 146 at the vertices of an equilateral triangle, the pivot means 146 will eventually also engage and move along lobe 182. This is highly desirable inasmuch as it will assure that the pivot means 145 remains fully received against seat 158.

Conversely, as the control lever 176 is moved from the neutral position through the second operating range toward the chain line position 176B, the throw member 115 will rotate about axis 149, the pivot means 146 being retained against seat 159. This is assured by the follower 185 as it traverses lobe 183, arcuate about seat 159. At the same time, the pivot means 145 will swing along travel slot 160 and into the voided area 180. Here too the pivot means 145 will eventually also engage and move along lobe 183 to assure retention of the pivot means 146 against seat 159 while the control lever 176 moves to the extremity of the second operating range.

By the use of the gull-wing camming surface 181 located in opposition to the bearing seats 158 and 159 the throw member 115 cannot be moved to release more than one pivot means at a time from its bearing seat. As such, the frame 112 can be oriented in any desired position, even upside down, so as to accommodate the run of cable 111. It should be noted that the same structural considerations are also incorporated within the control 110 as were discussed in conjunction with control 10. The swing center 130 is located within the neutral reference plane 128; the ratio of the radius from the swing center 130 to connector 135 with respect to the radius from the swing connector axis 136 to the pivot axes 148 or 149 is on the order of 4:1; and, the angle through which the end rod 132 swings is bisected by the axis 126 of the cable casing 118 as it is secured to the frame 112.

The employment of equilateral spacing for the interlock means 184 and the two pivot means 145 and 146 also accommodates some selective orientation of control lever 176. One need only provide two additional openings 188 to receive the carriage bolt 138 forming the axle for connector 135 to provide three possible orientations for control lever 176.

Selective orientation may be further enhanced by not using the rivets described in conjunction with control 10. The interlock 184, as well as the pivot means 145 and 146, may comprise a nut and bolt 189 and 190, respectively, to tighten the plates 150 and 151 against an annular collar 191 positioned therebetween, as shown in FIG. 8. The collar 191 will then comprise the journal means on which the follower 185, or sleeve bearings 155A and 155B, may rotate. Although FIG. 8 represents interlock means 184 in control 110, it must be appreciated that this arrangement could, as well be employed for the pivot means 45 and 46 and the interlock means 63 and 64 in control 10.

The control 110, as does control 10, provides the desired nonlinear movement to the motion transmitting device operatively connected thereto, and more visually to demonstrate the nonlinear function of the travel imparted to cable core 116 in response to movement of the control lever 176, movement of the core 116 by inches has been plotted against movement of the handle 176 by degrees on the graph comprising FIG. 9. To provide a frame of reference for the graph of FIG. 9, the control 110 used to compile the information plotted therein located the swing center 130 within the neutral reference plane 128 and 7 5/16" from the axis 136. The radius of connector 135 was one inch and the pivot axes 148 and 149 were spaced at equal distances—1 1/2"—on either side of axis 136 and, like axis 136, also within the neutral reference plane 128. The cable casing 118 was clamped to the frame 112 such that the axis 126 thereof lay 7° 25' below the neutral reference plane 128. The handle 176 was then moved through both the first and second operating ranges to provide 1 1/2" of core travel in each direction.

To accomplish the same range of movement to the core 116 it was necessary to move the handle 176 through 85° in the first operating range and through 95° in the second operating range. These ranges of movements were plotted to provide the graphic illustration of the nonlinear relation between the core displacement and the movement of the control lever. In this regard it should be particularly noted that to effect a 1/4" axial translation of the core 116 on either side of neutral it is necessary to move the control lever through approximately 30° in the first operating range and 37 1/2° in the second operating range, whereas a 1/4" translation of the core 116 at the end of these operating ranges is effected merely by moving the control lever 176 in approximately 8°.

Finally, it must be noted that when the end rod 132 and extension tube 129 are swung the 7° 25' beneath the axis 126 of the control cable 118 to the neutral position depicted in FIG. 6, the resilience of the core 116 may itself tend to swing the end rod 132 and extension tube 129 toward alignment with the casing 118, particularly with the larger cable sizes. Accordingly, it may be desirable to provide a seating bias that yieldingly urges the pivot means 145 and 146 into their respective seats 158 and 159 without inducing excessive resistance to the movement of the control lever at, or in proximity to, the neutral position. This can be accomplished by incorporating a resilient surface to the follower 185. As shown in FIG. 8, a resilient annulus 192 may be bonded onto the follower 185 for yieldingly engaging the camming surface 181.

This same result obtains by the use of a tension spring 192 which may be connected between the frame 112 and backing plate 151. Such a spring may selectively effect either a neutral "dead man" return or a means to retain the control fully actuated through the first and/or second operating ranges.

As depicted in FIGS. 10 and 11, the spring 192 is connected between an anchor tab 193, extending outwardly from frame 112, and an opposed ear 194, secured to the backing plate 151. With the spring 192 oriented transversely of the neutral reference plane 128 and medially of the pivotal axes 148 and 149, the pivot means 145 and 146 will be yieldingly retained in their respective bearing seats 158 and 159 when the control is in neutral.

As long as the direction of the force vector of spring 192 is oriented to lie between the pivotal axes 148 and 149, the spring 192 will act as a neutral "dead man" return. Referring specifically to the phantom representation in FIG. 10, the control lever 176 has been moved to swing the throw member 115 about axis 149, thus translating the ear 194 upwardly to the right to position 194' as viewed therein. So long as the force vector, represented by line 195, of spring 192 does not swing through pivot axis 149, the spring 192 will continually bias the throw member 115 to retrorotate toward the neutral position.

By selectively positioning the locations of the anchor tab 193 and/or the ear 194, the force vector will not cross either pivot axis even when the control lever has been moved to the fully actuated positions 176A and/or 176B (FIG. 6). As such, the control will always return to neutral when the control lever 176 is released, irrespective of the degree to which it has been moved. By the same token, however, the anchor tab 193 and ear 194 can be so oriented that the force vector 195 of spring 192 will swing through one of the pivotal axes when the control lever reaches a predetermined position. When the force vector thus swings through a pivot axis, the spring 192 will thereafter tend to urge the control lever to and retain it in, one of its fully actuated positions.

It should now be apparent that a control embodying the concept of the present invention induces movement to a motion transmitting device operatively attached thereto as a predetermined nonlinear function of the movement applied to the control lever and otherwise accomplishes the objects of the invention.

I claim:

1. A nonlinear control comprising, a frame, a throw member, at least a first pivot means, said throw member mounted for swinging movement with respect to said frame about the axis of said pivot means, a control lever for swinging said throw member about the axis of said pivot means from a neutral position through at least a first actuating range, a connector, said connector rotatably mounted on said throw member about an axis located eccentrically with respect to the axis of said pivot means, the working element of a motion transmitting device being secured to said connector so that the line of action thereof within the control transversely intersects the axis of said pivot means and the axis about which said connector is mounted to said throw member when said control is in neutral.

2. A nonlinear control comprising a frame, a throw member, at least a first pivot means, said throw member mounted for swinging movement with respect to said frame about the axis of a first pivot means, a control lever for swinging said throw member about the axis of said first pivot means from a neutral position through at least a first actuating range, a connector, said connector rotatably mounted on said throw member about an axis located eccentrically with respect to the axis of said first pivot means, the working element of a motion transmitting device operatively secured to said connector, said throw member being also selectively swingable about the axis of a second pivot means, said second pivot means being located eccentrically with respect to the axis of said connector and oppositely of the first said pivot means, swinging movement of said throw member about the axis of said second pivot means effected by movement of said control lever from the neutral position through a second actuating range oppositely of said first actuating range, both said pivot means being secured to said throw member and being received in spaced bearing seats in said frame, said bearing seats each having a travel slot extending therefrom in a path arcuate about the opposite bearing seat, and interlock means permitting said throw member to swing only about the first pivot means when the control lever is within the first actuating range and to swing only about the second pivot means when the control lever is within the second actuating range.

3. A nonlinear control, as set forth in claim 1, in which the throw member is selectively swingable about the axis of a second pivot means, said second pivot means being located eccentrically with respect to the axis of said connector and oppositely of the first said pivot means, swinging movement of said throw member about the axis of said second pivot means effected by movement of the control lever from the neutral position through a second actuating range oppositely of said first actuating range.

4. A nonlinear control, as set forth in claim 3, in which the second pivot means is located such that the line of action of the working element of the motion transmitting device within the control transversely intersects the axes of said two pivot means and the axis about which said connector is mounted to said throw member.

5. A nonlinear control, as set forth in claim 4, in which interlock means permits said throw member to swing only about the first pivot member when the control lever is within the first actuating means and to swing only about the second pivot means when the control lever is within the second actuating range.

6. A nonlinear control, as set forth in claim 2, in which the interlock means comprises followers secured to said throw member and movable against control cams in said frame.

7. A nonlinear control, as set forth in claim 6, in which the working element of the motion transmitting device is secured to said connector so that the line of action thereof within the control transversely intersects the axes of both pivot means and the axis about which said connector is mounted to said throw member when said control is in neutral.

8. A nonlinear control, as set forth in claim 2, in which the interlock means comprises, first and second follower means secured to said throw member, aperture means in said frame, said follower means being movably received in said aperture means, said first follower means retaining said first pivot means in its corresponding bearing seat when the control lever is in the first operating range and said second follower means retaining said second pivot means in its corresponding bearing seat when the control lever is in the second operating range.

9. A nonlinear control, as set forth in claim 8, in which first and second aperture means, respectively, interact with first and second follower means, each said aperture means having a camming portion and a throat portion, the camming portion of said first aperture means being arcuate about said first pivot means, the throat portion of said first aperture means being arcuate about said second pivot means, the camming portion of said second aperture means being arcuate about said second pivot means, the throat portion of said aperture means being arcuate about said first pivot means.

10. A nonlinear control, as set forth in claim 2, in which the interlock means comprises follower means secured to said throw member, a voided area in said frame, a camming surface along at least a portion of said voided area, said camming surface having first and second lobes, said follower means engaging the first of said lobes to retain said first pivot means in its corresponding bearing seat when the control lever is in the first operating range, said follower means engaging the second of said lobes to retain said second pivot means in its corresponding seat when the control lever is in the second operating range.

11. A nonlinear control, as set forth in claim 10, in which the first lobe in arcuate about the seat in which said first pivot means is received when said control lever is within the first operating range and in which the second lobe is arcuate about the seat in which said second pivot means is received when said control lever is within the second operating range.

12. A nonlinear control, as set forth in claim 11, in which said first and second lobes meet at an apex, said follower means engaging said apex to retain both said pivot means within their respective seats when the control is in neutral.

13. A nonlinear control, as set forth in claim 12, in which yielding means bias said first and second pivot means in their respective bearing seats when the control is in neutral.

14. A nonlinear control, as set forth in claim 10, in which the follower means and said first and second pivot means are spaced equilaterally on said throw member to facilitate selective orientation of said control lever.

15. A nonlinear control, as set forth in claim 2, in which a brake means retards rotation of the connector with respect to the throw member.

16. A nonlinear control, as set forth in claim 2, in which the motion transmitting device comprises a push-pull cable having a core reciprocably slidable in a casing, the casing secured to said frame and the core operatively attached to said connector, the line of action of said core, within said control, transversely intersecting the axes of said two pivot means and the axis about which said connector is mounted to said throw member when the control is in neutral, the neutral orientation of said three axes thus defining a neutral reference plane, the line of action of said core, within said control, being swingable, during operation of said control, about a swing center also located within said neutral reference plane.

17. A nonlinear control, as set forth in claim 16, in which the axis of the cable casing, as it is secured to said frame, bisects the angle through which the line of action of said core, within the control, swings during operation of said control from neutral through said two operating ranges.

18. A nonlinear control, as set forth in claim 2, in which an anchor means connects said spring means to said frame and said throw member yieldingly to bias said first and second pivot means against their respective bearing seats when the control is in neutral.

19. A nonlinear control, as set forth in claim 18, in which an anchor means connects said spring means to said frame and an ear means connects said spring means to said throw member, said spring means biasing said throw member in a direction predetermined by the location of said anchor means and ear means with respect to said pivot means.

References Cited

UNITED STATES PATENTS

| 2,814,957 | 12/1957 | Mitrovich | 74—471 |
|---|---|---|---|
| 3,143,994 | 8/1964 | Morse | 74—502 |
| 3,395,551 | 8/1968 | Morse | 64—3 |

FRED C. MATTERN, JR., Primary Examiner

R. HEALD, Assistant Examiner

U.S. Cl. X.R.

74—501